(12) United States Patent
Uehara

(10) Patent No.: US 6,459,029 B2
(45) Date of Patent: Oct. 1, 2002

(54) METHOD AND APPARATUS FOR DISPLAYING MULTIPLE IMAGES OF MUSICAL SCORE DATA ON SCREEN OF DISPLAY

(75) Inventor: Haruki Uehara, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/886,525

(22) Filed: Jun. 20, 2001

(30) Foreign Application Priority Data

Jun. 21, 2000 (JP) ...................................... 2000-186917

(51) Int. Cl.$^7$ .............................................. G09B 15/02
(52) U.S. Cl. .................................. 84/477 R; 84/483.1
(58) Field of Search ........................... 84/470 R, 471 R, 84/477 R, 483.1

(56) References Cited

U.S. PATENT DOCUMENTS 5,760,323 A * 6/1998 Romero et al. ............ 84/470 R
6,062,867 A * 5/2000 Torimura .............. 84/477 R X

* cited by examiner

Primary Examiner—Jeffrey Donels

(74) Attorney, Agent, or Firm—Morrison & Foerster LLP

(57) ABSTRACT

A musical score display apparatus is installed in a grand piano to display multiple images of pages of a musical score of a prescribed musical tune on the screen. Each of the multiple images of the musical score is divided into the prescribed number of sections, each of which corresponds to at least a prescribed length of a staff for arranging notes in musical notation and which are vertically arranged at different positions on the screen. In addition, different background colors are assigned to odd-numbered pages and even-numbered pages of the musical score respectively. The multiple images of the musical score are automatically and sequentially changed over section by section on the screen, so that the background colors are correspondingly changed over section by section on the screen. Herein, the images of the musical score are sequentially changed over section by section without changing the positions of the sections being fixed on the screen. Alternatively, it is possible to vertically scroll the images of the musical score section by section on the screen. Incidentally, each section is changed over in content and background color upon a lapse of a prescribed time, which is preset in advance in accordance with musical performance or progression of the section. Hence, the user is able to visually recognize changeovers of the multiple images of the musical score on the screen with ease by detecting changeovers of the background colors being respectively assigned to consecutive pages of the musical score.

14 Claims, 11 Drawing Sheets

100 : GRAND PIANO

FIG. 10A
| WHITE |
|---|
| WHITE |
| WHITE |
| WHITE |
| WHITE |
| WHITE |
FIG. 10B
| YELLOW |
|---|
| WHITE |
| WHITE |
| WHITE |
| WHITE |
| WHITE |
FIG. 10C
| YELLOW |
|---|
| YELLOW |
| WHITE |
| WHITE |
| WHITE |
| WHITE |
FIG. 10F
| YELLOW |
|---|
| YELLOW |
| YELLOW |
| YELLOW |
| YELLOW |
| WHITE |
FIG. 10E
| YELLOW |
|---|
| YELLOW |
| YELLOW |
| YELLOW |
| WHITE |
| WHITE |
FIG. 10D
| YELLOW |
|---|
| YELLOW |
| YELLOW |
| WHITE |
| WHITE |
| WHITE |

FIG. 11A

| PAGE A, SECTION 1 (WHITE) |
| PAGE A, SECTION 2 (WHITE) |
| PAGE A, SECTION 3 (WHITE) |
| PAGE A, SECTION 4 (WHITE) |
| PAGE A, SECTION 5 (WHITE) |
| PAGE A, SECTION 6 (WHITE) |

| PAGE A, SECTION 2 (WHITE) |
| PAGE A, SECTION 3 (WHITE) |
| PAGE A, SECTION 4 (WHITE) |
| PAGE A, SECTION 5 (WHITE) |
| PAGE A, SECTION 6 (WHITE) |
| PAGE B, SECTION 1 (YELLOW) |

| PAGE A, SECTION 3 (WHITE) |
| PAGE A, SECTION 4 (WHITE) |
| PAGE A, SECTION 5 (WHITE) |
| PAGE A, SECTION 6 (WHITE) |
| PAGE B, SECTION 1 (YELLOW) |
| PAGE B, SECTION 2 (YELLOW) |

| PAGE A, SECTION 1 (WHITE) |
| PAGE A, SECTION 2 (WHITE) |
| PAGE A, SECTION 3 (WHITE) |
| PAGE A, SECTION 4 (WHITE) |
| PAGE A, SECTION 5 (WHITE) |
| PAGE A, SECTION 6 (WHITE) |

| PAGE B, SECTION 6 (YELLOW) |
| PAGE A, SECTION 2 (WHITE) |
| PAGE A, SECTION 3 (WHITE) |
| PAGE A, SECTION 4 (WHITE) |
| PAGE A, SECTION 5 (WHITE) |
| PAGE A, SECTION 6 (WHITE) |

| PAGE B, SECTION 5 (YELLOW) |
| PAGE B, SECTION 6 (YELLOW) |
| PAGE A, SECTION 3 (WHITE) |
| PAGE A, SECTION 4 (WHITE) |
| PAGE A, SECTION 5 (WHITE) |
| PAGE A, SECTION 6 (WHITE) |

⋮

METHOD AND APPARATUS FOR DISPLAYING MULTIPLE IMAGES OF MUSICAL SCORE DATA ON SCREEN OF DISPLAY

BACKGROUND OF THE INVENTION

1. Field of the Invention

This invention relates to methods and apparatuses for displaying multiple images or pictures of data, particularly multiple images of musical score data on screens of displays.

2. Description of the Related Art

Conventionally, various ideas are proposed as methods for successively displaying multiple images of data on a single screen of a display. One method is to instantaneously change over the present image with the next one on the screen, and another method is to scroll the data across the screen vertically or horizontally. According to the scroll display method, for example, an entire area of the screen is divided into multiple sections by units of lines. Scrolling information across the screen vertically, the display stops displaying an uppermost line of data which is originally displayed on the uppermost line on the screen, while shifting other lines of data upwards on the screen. In addition, new data is displayed at the lowermost line on the screen. Thus, it is possible to vertically scroll the information across the screen line by line.

It is possible to propose another idea as a method for successively displaying multiple images of data on a single screen of the display, which is described below.

First, data of multiple images are divided into data of pages (or multiple page data), each of which is further divided into data of sections or passages. Display positions are set to the data of sections respectively. The aforementioned operations are repeated to successively divide the page data into the data of sections and to set the display positions to them respectively. In order to change over data of a certain page with data of a next page on the screen, the data are successively changed over with new ones with respect to sections respectively. That is, the content of display is not entirely changed over at once but is partially changed over every section on the screen.

In contrast to the scroll display method, the aforementioned method does not entirely move the content of display vertically on the screen. In other words, the content of display is successively changed over every section from the present page to the next page.

Certain kinds of data do not substantially change contents thereof among multiple images being sequentially displayed on the screen. In other words, these data apparently resemble each other among the multiple images being displayed on the screen. Therefore, users may have difficulty in discriminating between contents of the multiple images being changed over on the screen. For example, it is possible to list musical score data that are basically configured by notes and staves, which may be hard to discriminate. That is, images of musical scores are successively displayed on the screen of the display on the basis of the musical score data. Herein, each of images of the musical score data being successively displayed on the screen is configured by notes arranged on staves in musical notation. Each image shows the same staves at the same positions on the screen whereas each image shows different notes (or the same notes). So, even when the display changes over images on the screen, the user may have a difficulty in visually recognizing a changeover of the images on the screen. Particularly, if the user watches the screen again after the user takes his/her eyes off from the screen, it is likely that the user will fail to notice the changeover of the images on the screen. If the user plays a musical instrument while watching the musical scores being displayed on the screen, it is necessary for the user to grasp successively changing contents of the musical score in real time on the screen. Therefore, the user may have a great difficulty in playing the musical instrument because of his/her inability to discriminate changeovers of images of the musical scores on the screen.

The aforementioned scroll display method partially changes over the images on the screen, however, it also has problems similar to those caused by instantaneously and entirely changing over the images on the screen. Musical scores contain different contents of musical notation, however, which may apparently resemble each other. When successively displaying similar musical score data on the screen, it is very difficult for the user to accurately detect whether the musical score data are scrolled or not.

Different from the scroll display method, the aforementioned method does not cause movement of data entirely across the screen in displaying multiple images of data on the screen. According to this method that does not move data items on the screen, it is possible to reduce the probability that the user will overlook the content of data presently displayed on the screen. However, this method causes changeovers of the images on the screen with respect to the sections respectively. As similar to the scroll display method, this method also has problems due to the user's inability to discriminate changeovers of the images on the screen.

SUMMARY OF THE INVENTION

It is an object of the invention to provide a data display method and a data display apparatus by which a user is capable of easily recognizing changeovers of images being successively displayed on the screen of the display.

A musical score display apparatus of this invention is installed in a musical instrument such as a grand piano to display multiple images of consecutive pages of a musical score of a prescribed musical tune being successively changed over on the screen. Each of the images of the pages of the musical score is divided into a prescribed number of sections, each of which corresponds to at least a prescribed length of a staff for arranging notes in musical notation and which are vertically arranged at different positions on the screen. In addition, different background colors are assigned to odd-numbered pages and even-numbered pages of the musical score respectively.

In a full change mode, each of the multiple images of the pages of the musical score is entirely changed over page by page on the screen, wherein the background color is correspondingly changed over across an overall area of the screen.

In an auto change mode, each of the multiple images of the pages of the musical score is automatically changed over section by section on the screen, so that the background color is correspondingly changed over section by section on the screen. If prescribed positions on the screen are fixedly allocated to the sections respectively, the images of the musical score are sequentially changed over section by section without changing the positions of the sections on the screen. Alternatively, it is possible to vertically scroll the images of the musical score section by section on the screen.

Each section is changed over in content and background color when a prescribed period of time elapses, which is preset in advance in accordance with musical performance or progression of the section. It is possible to designate the prescribed time manually.

As described above, the user is able to visually recognize changeovers of the multiple images of the musical score on the screen with ease by detecting changeovers of the background colors being respectively assigned to consecutive pages of the musical score. Incidentally, it is possible to change over other styles such as background patterns other than the background colors on the screen.

BRIEF DESCRIPTION OF THE DRAWINGS

These and other objects, aspects and embodiments of the present invention will be described in more detail with reference to the following drawing figures, of which:

FIG. 10A diagrammatically shows six sections being displayed with white background color on the screen in response to the musical score of the odd-numbered page;

FIG. 10B diagrammatically shows that the uppermost section is changed in content and is displayed with yellow background color on the screen in response to the musical score of the even-numbered page;

FIG. 10C diagrammatically shows that a second section is additionally changed in content and is displayed with yellow background color on the screen;

FIG. 10D diagrammatically shows that a third section is further changed in content and is displayed with yellow background color on the screen;

FIG. 10E diagrammatically shows that a fourth section is further changed in content and is displayed with yellow background color on the screen;

FIG. 10F diagrammatically shows that a fifth section is further changed in content and is displayed with yellow background color on the screen;

FIG. 11A diagrammatically shows that six sections of page A are originally displayed with white background color on the screen, which is used to explain the scroll display method applied to the musical score display apparatus;

FIG. 11B diagrammatically shows that five sections of page A are scrolled upwardly while one section of page B is newly displayed with yellow background color in the lowermost section on the screen;

FIG. 11C diagrammatically shows that four sections of page A are scrolled upwardly while two sections of page B are displayed with yellow background color in the lower area on the screen;

FIG. 11D diagrammatically shows that six sections of page A are originally displayed with white background color on the screen, which is used to explain another type of the scroll display method applied to the musical score display apparatus;

FIG. 11E diagrammatically shows that five sections of page A remain at the same positions on the screen while one section of page B is newly displayed with yellow background color in the uppermost section on the screen; and FIG. 11F diagrammatically shows that four sections of page A remain at the same positions on the screen while two sections of page B are displayed with yellow background color in the upper area on the screen.

DESCRIPTION OF THE PREFERRED EMBODIMENT

This invention will be described in further detail by way of examples with reference to the accompanying drawings.

[A] Configuration of Embodiment

Figure 1:
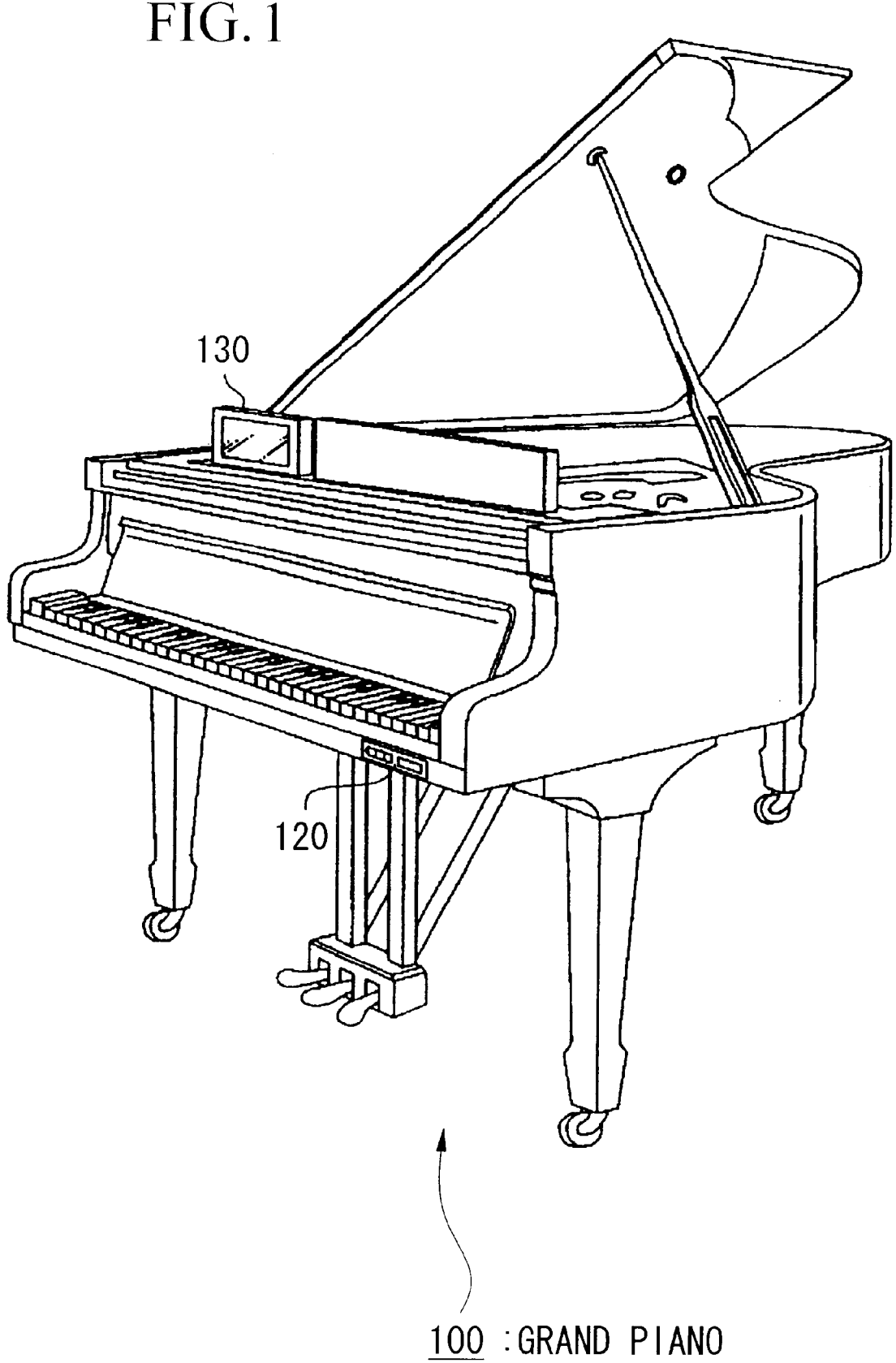
FIG. 1 is a perspective view showing an appearance of a grand piano that installs a musical score display apparatus in accordance with the preferred embodiment of the invention.

FIG. 1 shows an appearance of a grand piano installing a musical score display apparatus in accordance with the preferred embodiment of the invention. Namely, the grand piano '100' has a display panel 130 that is arranged next to a music stand for supporting musical scores. The display panel 130 is designed to display data of musical scores and the like. An operator console 120 is arranged at a prescribed right position on a front side of a key bed of a keyboard. Hence, the user operates the operator console 120 to turn on or off and control the display panel 130. In other words, the operator console 120 allows the user to arbitrarily select the musical score being displayed on the screen of the display panel 130.

Except for provision of the musical score display apparatus containing the display panel 130 and operator console 120, the grand piano 100 is configured in a manner similar to that of typical grand pianos. Of course, the grand piano 100 has an action mechanism and other mechanical parts similar to those of conventional grand pianos. For convenience' sake, the present specification does not describe details of the mechanics of the grand piano 100.

Figure 2:
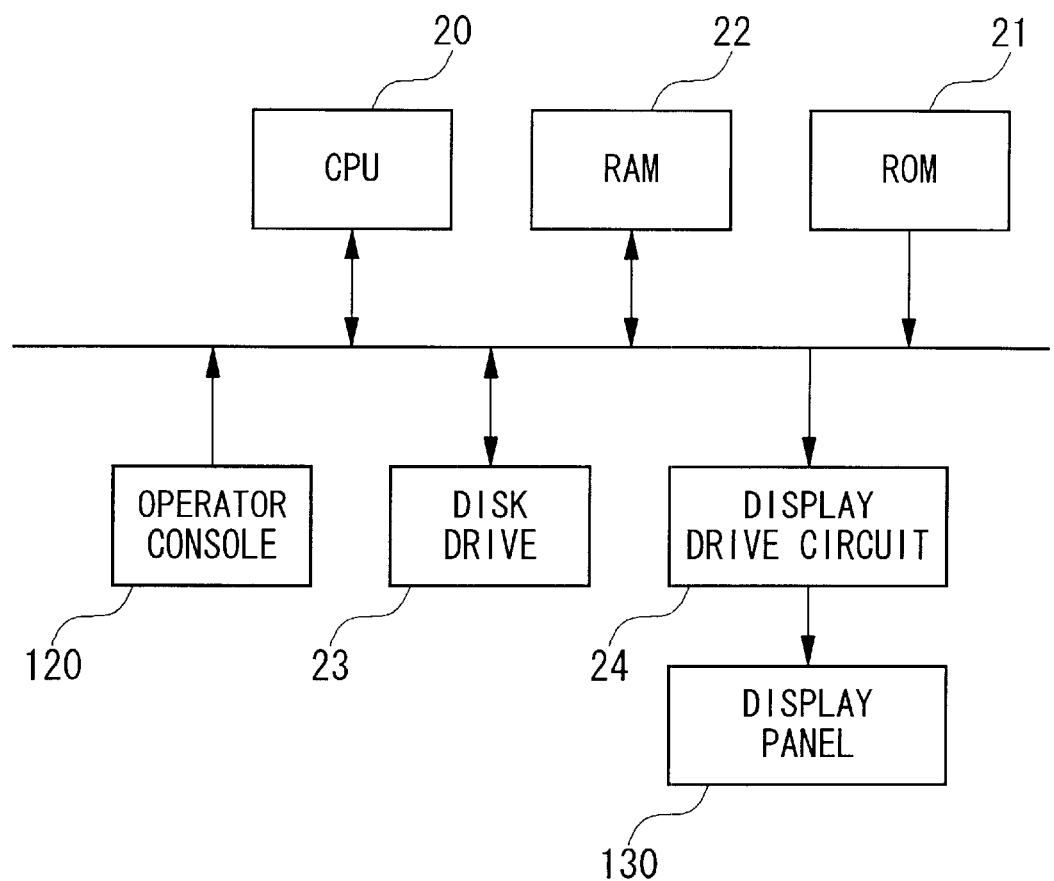
FIG. 2 is a block diagram showing an electrical configuration of the musical score display apparatus that contains an operator console and a display panel.

FIG. 2 shows an electrical configuration of the musical score display apparatus installed in the grand piano 100. In addition to the display panel 130 and operator console 120, the musical score display apparatus contains a central processing unit (CPU) 20, a read-only memory (ROM) 21, a random-access memory (RAM) 22, a disk drive 23 and a display drive circuit 24.

The operator console 120 provides switches and controls that can be operated by the user. Turning the switches (and controls), it is possible to turn on or off the display panel 130 for displaying the musical score, and it is possible to input commands and instructions with regard to the musical score(s) being displayed on the screen of the display panel 130. That is, the user is able to select a musical tune whose musical score is to be displayed on the screen, and the user is also able to change pages of the musical scores of the selected musical tune on the screen. Specifically, the present embodiment provides three types of switches on the operator console 120. Namely, a tune select switch is used to input a musical tune number designating a specific musical tune whose musical score is to be displayed on the screen, an auto change switch is used to designate an auto change mode for automatically changing over images of the musical score of the selected musical tune being displayed on the screen, and a full change switch is used to designate a full change mode for entirely changing the image of the musical score across the screen from the present page to the next page. Input information is created by the operator console 120 whose switches are manually operated by the user and is forwarded to the CPU 20. Thus, the CPU 20 performs various types of controls on the display panel 130 in response to the input information.

Reading programs that are pre-installed in the ROM 21, the CPU 20 performs musical score display processes, by which the musical score display apparatus is to be controlled. In execution of the processes, the CPU 20 uses the RAM 22 as a working area. The disk drive 23 is used to read data stored in prescribed types of recording media such as the hard disk, CD-ROM, floppy disk and DVD-ROM. Reading musical score display data from the recording media installed in the disk drive 23, the musical score display apparatus executes the musical score display processes so that musical scores are to be displayed on the screen of the display panel 130. Details of the musical score display data and musical score display processes will be described later.

The display drive circuit 24 has an image memory for use in display of images on the screen of the display panel 130. In accordance with the musical score display processes executed by the CPU 20, image data representing images of musical scores are written to the image memory. Hence, the display panel 130 displays on the screen, the images corresponding to the image data written to the image memory of the display drive circuit 24.

Figure 3:
FIG. 3 shows an example of an image of a musical score containing six staves being displayed on the screen of the display panel.

Next, a description will be given with respect to configurations of the musical score display data. The musical score display apparatus of the present embodiment is designed to display musical scores, in which notes and other symbols in musical notation are arranged on staves, on the screen of the display panel 130. That is, the display panel 130 has a display area for displaying an image of the musical score that consists of six staves being arranged vertically on the screen, an example of which is shown in FIG. 3. That is, the display panel 130 displays on the display area of the screen, an image of the musical score containing six staves in accordance with the musical score display data, which will be described below.

Figure 4:
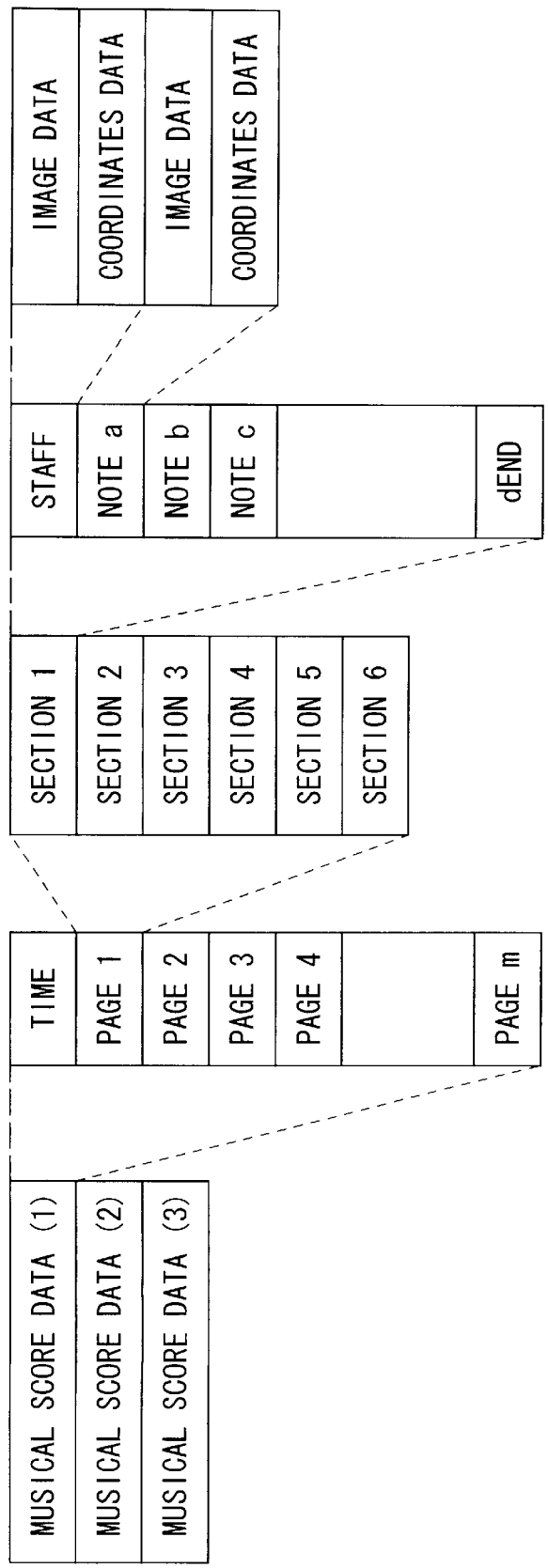
FIG. 4 shows configurations of musical score display data that provide multiple sets of musical score data corresponding to different musical tunes respectively.

As shown in FIG. 4, the musical score display data provides multiple sets of musical score data for musical tunes respectively. That is, each musical score data contain data designating a musical tune number, which ranges between '1' and 'n' (where 'n' is an integer arbitrarily selected). When the user selects a musical tune by designating its musical tune number, the musical score display apparatus loads musical score data having data of the designated musical tune number by means of the disk drive 23. The musical score data are used for execution of the musical score display processes.

Each musical tune provides a prescribed amount of musical score data that are configured by the number of pages, each of which matches with the size of the screen of the display panel 130. That is, the display panel 130 displays the musical score data of one page on the screen at once. In addition, the musical score data contain time count data representing the time duration that is necessary for musical performance of one section of the musical score. The time count data are used for the auto change mode for automatically changing images of the musical score on the screen. It is possible to substitute absolute time data for the time count data, wherein the absolute time data represents an absolute time that is counted during musical performance of the musical score based on the beat symbol and velocity symbol, which are denoted on the musical score, as well as the number of measures included in one section of the musical score (e.g., two measures in FIG. 3). In the case of the apparatus that can arbitrarily set a tempo, it is possible to use data that is produced based on the beat symbol and the number of measures included in one section of the musical score, an overall length of which can be represented by a sum of lengths of notes. Herein, it is possible to represent an overall length of one section of the musical score by the number of quarter notes, for example. In the case of FIG. 3, it is possible to represent an overall length of two measures, corresponding to one section of the musical score, by eight quarter notes.

The musical score data of one page contain data of six staves each consisting of two measures, namely data of six sections. Data of each section contain staff data for displaying a staff of two measures, note data representing notes (namely, a, b, c, . . . ) being arranged on the staff, and data 'dEND' indicating an end of arrangement of the notes on the staff. The staff data contain staff image data for displaying an image of a staff and staff coordinates data for designating coordinates (i.e., display positions) of the staff on the screen. Similarly, the note data contain note image data for displaying an image of a note and note coordinates data for designating coordinates (i.e., display position) of the note on the screen. According to the musical score display processes, images of staves (each containing five lines and other symbols in musical notation) are displayed at positions designated by the staff coordinates data, while images of notes are sequentially arranged on the staves and are displayed at positions designated by the note coordinates data. Thus, it is possible to complete each section of the musical score being displayed on the screen.

[B] Operations of Embodiment

Next, descriptions will be given with respect to operations of the musical score display apparatus of the present embodiment, wherein the CPU 20 executes the musical score display processes in accordance with the programs stored in the ROM 21. Next, the musical score display processes being executed by the CPU 20 will be described with reference to flowcharts of FIGS. 5 to 8.

Figure 5:
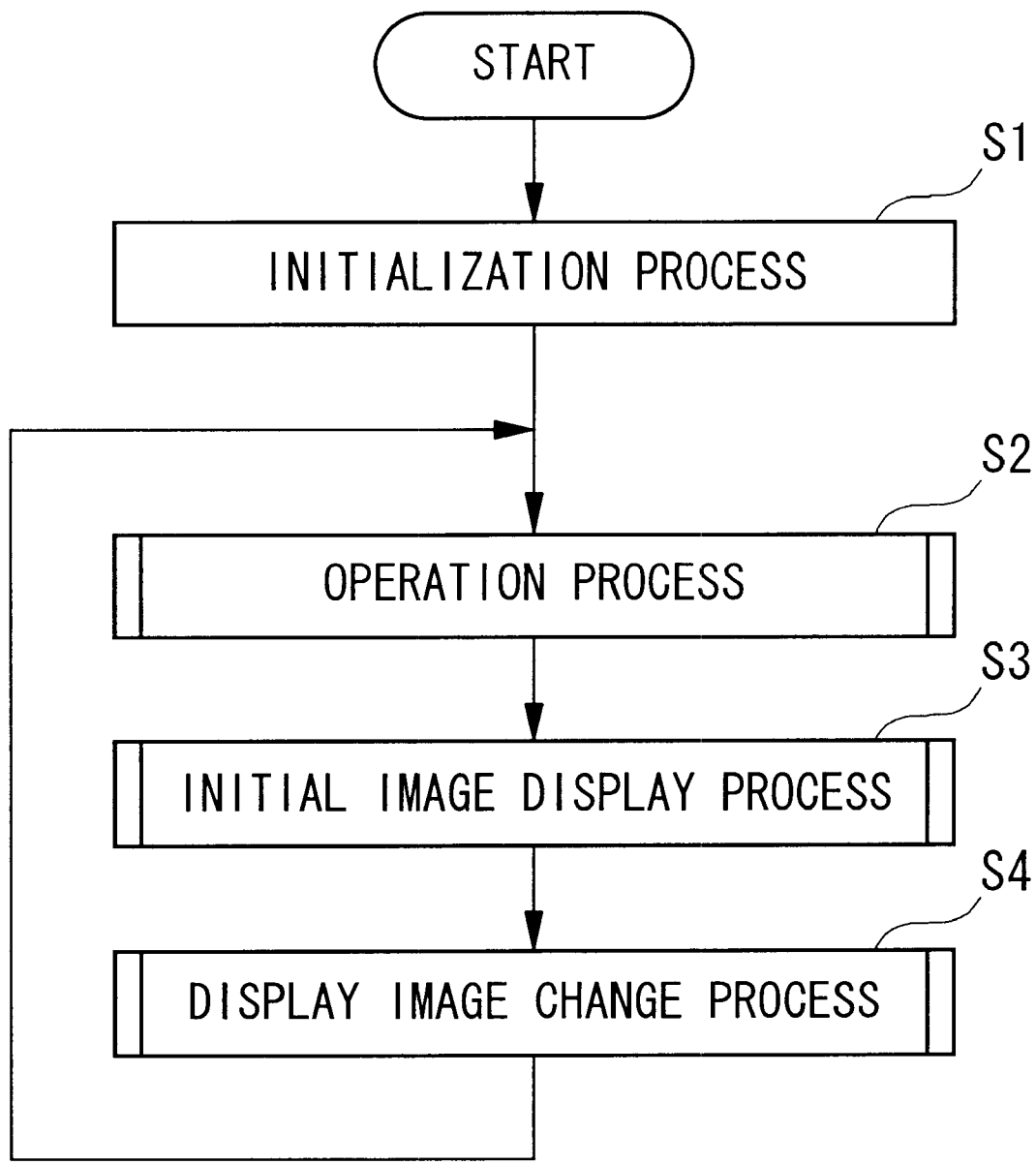
FIG. 5 is a flowchart showing a main routine being executed by a CPU of the musical score display apparatus.

When electric power is applied to the musical score display apparatus, a main routine of FIG. 5 is activated so that the flow proceeds to step S1 in which an initialization process is performed. In the initialization process, various kinds of data and variables are initialized. In step S2, operation processes are performed in response to conditions of the switches of the operator console 120. Upon execution of the operation processes, an initial image display process is performed in step S3 so that an initial image of the musical score, namely a first page of the musical score, is displayed on the screen of the display panel 130. Then, the flow proceeds to step S4 in which a display image change process is performed to change over images of the musical score being displayed on the screen of the display panel 130. The aforementioned processes of the steps S2 to S4 are repeatedly performed as long as the electric power is continuously applied to the musical score display apparatus.

The above is an outline of the processes being executed by the CPU 20. Next, details of the operation process, initial image display process and display image change process will be described with reference to FIGS. 6, 7 and 8 respectively.

Figure 6:
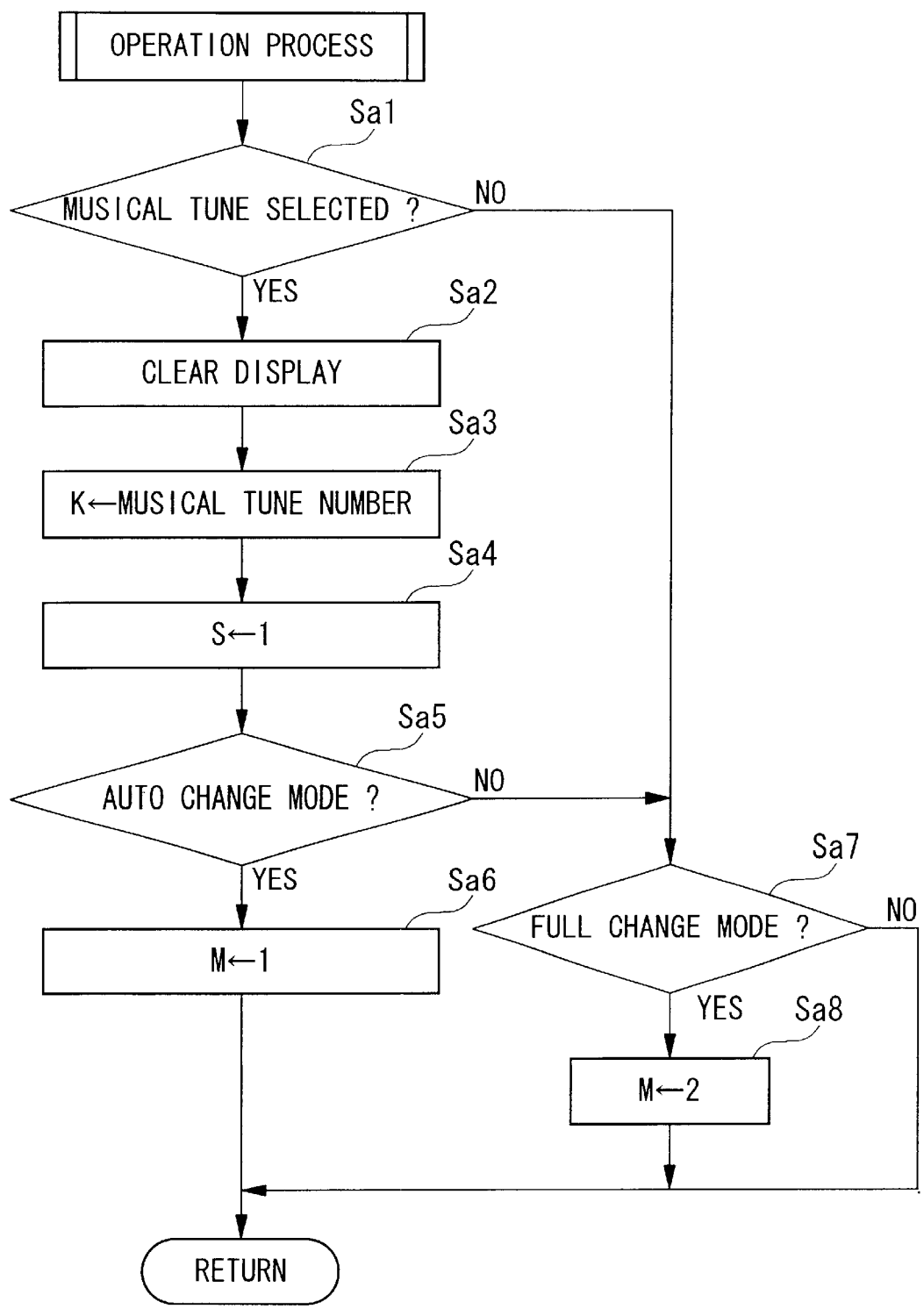
FIG. 6 is a flowchart showing an operation process being executed by the CPU of the musical score display apparatus.

FIG. 6 shows the detailed content of the operation process in which the flow firstly proceeds to step Sa1 in response to a manual operation applied to the switch of the operator console 120. That is, a decision is made as to whether the user operates the operator console 120 to select a musical tune or not. If the user does not select the musical tune, the flow directly proceeds to step Sa7 in which a decision is made as to whether the apparatus is instructed to set a full change mode for entirely changing the image across the screen or not. If the user selects a certain musical tune so that a decision result of step Sa1 is "YES", the flow proceeds to step Sa2 in which the apparatus clears an image presently displayed on the screen of the display panel 130.

In step Sa3, a variable K is set to a value corresponding to a musical tune number that represents the musical tune selected by the user. In step Sa4, a variable S is set to '1'. The variable S is used to make determination whether to perform the initial image display process or not. Details of the initial image display process will be described later. If the variable S is set to '1', the apparatus performs the initial image display process.

In step Sa5, a decision is made as to whether the user operates the operator console 120 to designate an auto change mode or not. If the user designates the auto change mode, the flow proceeds to step Sa6 in which a variable M is set to '1', then, the apparatus ends the operation process. If the user does not designate the auto change mode, the flow proceeds to step Sa7 in which a decision is made as to whether the user designates a full change mode or not. If the user designates the full change mode, the flow proceeds to step Sa8 in which the variable M is set to '2', then, the apparatus ends the operation process.

Figure 7:
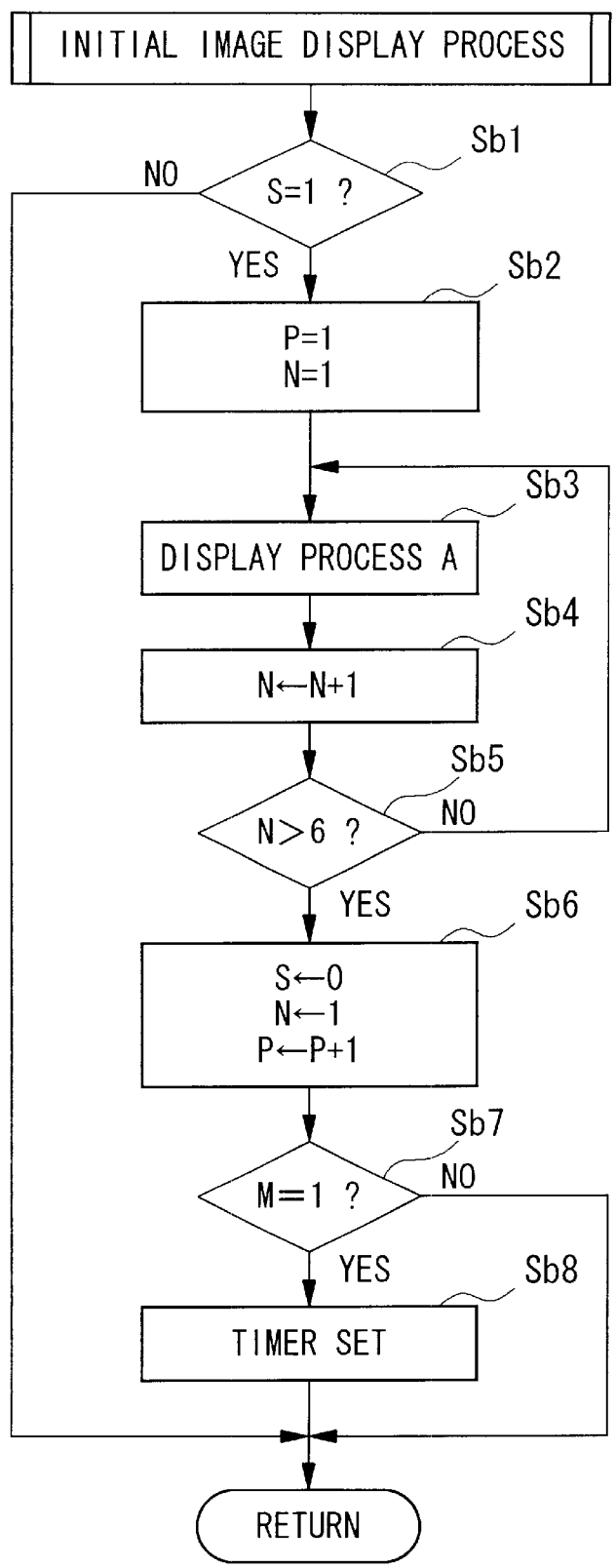
FIG. 7 is a flowchart showing an initial image display process being executed by the CPU of the musical score display apparatus.

Next, the initial image display process will be described with reference to FIG. 7. In step Sb1 of the initial image display process, a decision is made as to whether the variable S is set to '1' or not. If the variable S is not set to '1', the apparatus immediately ends the initial image display process. If S=1, the flow proceeds to step Sb2 in which a variable P representing a page number of the musical score is set to '1', and a variable N representing a section number of the page of the musical score is set to '1'.

As described above, the variable K designates the musical tune that is selected by the user, the variable P designates the page number of the musical score, and the variable N designates the section number of the page of the musical score. The flow proceeds to step Sb3 in which the CPU 20 reads musical score data in response to the aforementioned variables K, P and N. Then, the CPU 20 writes data indicative of the staff and its notes to a memory (not shown) of the display drive circuit 24 in conformity with positions designated by coordinates data included in the read musical score data. Thus, the staff and its notes are adequately displayed on the screen of the display panel 130. In an initial condition, the CPU 20 performs a display process with respect to section 1 of page 1 of the musical score. The CPU 20 initiates the initial image display process to display staves and notes written on page 1 of the musical score. That is, the CPU 20 performs a display process A in which an entire background of the screen is initially painted in white color in displaying the staves and notes of page 1 of the musical score in accordance with the initial image display process. The background color is alternately changed between white color and yellow color in response to changeovers of pages of the musical score being successively displayed on the screen. That is, the display process A using the 'white' background color is effected on each of odd-numbered pages of the musical score being displayed on the screen. In contrast, a display process B using the 'yellow' background color is effected on each of even-numbered pages of the musical score being displayed on the screen.

After completing the display process with respect to the section 'N' (e.g., section 1) of page 1 of the musical score, the flow proceeds to step Sb4 in which the variable N is incremented by '1'. Then, the flow proceeds to step Sb5 in which a decision is made as to whether the incremented variable N exceeds '6'or not. This is because each page of the musical score includes six sections (namely, section 1 to section 6) as shown in FIG. 3. If the variable N is '6' or less, the flow returns to step Sb3, so that the display process is performed with respect to the next section of page 1 of the musical score corresponding to the incremented variable N.

If the variable N is above '6' indicating that the display process is completed with respect to all of six sections of page 1 of the musical score, the flow proceeds to step Sb6 without performing a new display process. In step Sb6, the variable S is set to '0', the variable N is set to '1', and the variable P is incremented by '1'. In step Sb7, a decision is made as to whether the variable M is set to '1' or not. In other words, a decision is made as to whether the apparatus is set to the auto change mode or not. If M=1 indicating the auto change mode, the flow proceeds to step Sb8 in which a timer (not shown) is set to a value that is designated by the time count data contained in the musical score data (see FIG. 4). That is, the timer is set to the time that is necessary for musical performance of one section of the musical score corresponding to the musical score data. If the variable M is not set to '1', in other words, if the apparatus is not set to the auto change mode, the apparatus ends the initial image display process.

Figure 8:
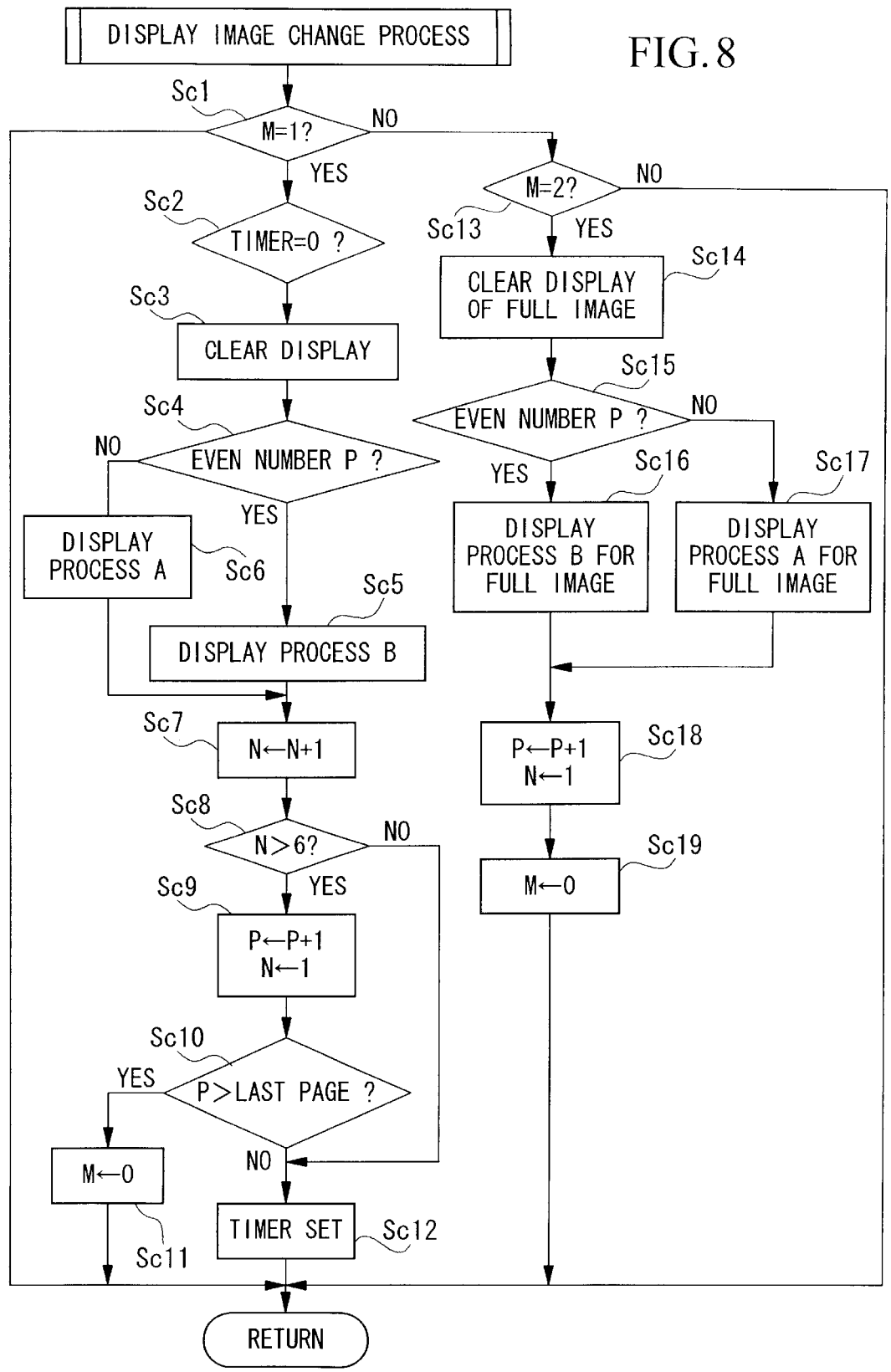
FIG. 8 is a flowchart showing a display image change process being executed by the CPU of the musical score display apparatus.
Figure 9:
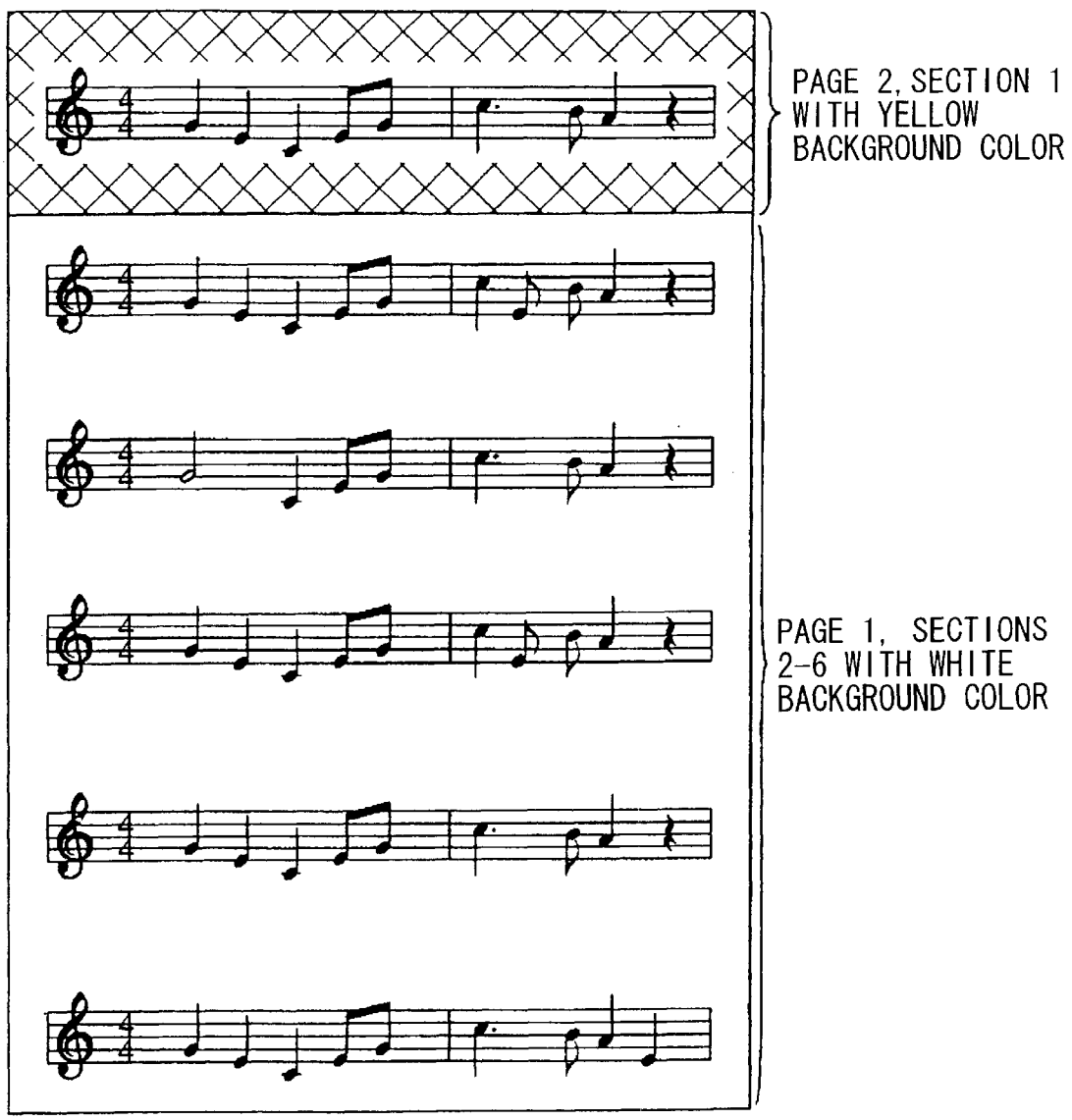
FIG. 9 shows an example of an image of a musical score containing six staves, the uppermost one of which is changed over by the display image change process on the screen.

Next, the display image change process will be described with reference to FIG. 8. In step Sc1 of the display image change process, a decision is made as to whether the variable M is set to '1' or not, in other words, a decision is made as to whether the apparatus is set in the auto change mode or not. If M=1 indicating the auto change mode, the flow proceeds to step Sc2 in which a decision is made as to whether the value of the timer is decreased to '0' or not. The timer is set to a certain value by the foregoing step Sb8 of the initial image display process or by the display image change process. If the timer is not zero, it is presumed that the time necessary for musical performance of one section of the musical score does not elapse completely. Hence, the apparatus ends the display image change process.

If the timer is zero indicating that the time necessary for musical performance of one section of the musical score elapses completely, it is necessary to change an image of section N of the musical score being presently displayed on the screen. In order to do so, the image of section N of the musical score is entirely cleared on the screen in step Sc3. In step Sc4, a decision is made as to whether the variable P is presently set to an even number or not. In other words, a decision is made as to whether or not musical score data of an even-numbered page is used to display a new image for the section N whose original image is cleared on the screen. If the variable P designates an even number, that is, if the musical score data of the even-numbered page is used to display the new image for the section N of the musical score on the screen, the CPU 20 reads the musical score data whose page is designated by the variable P and whose section is designated by the variable N. Based on the read musical score data, the new image is displayed in the section N of the musical score on the screen. If the musical score data of the even-numbered page is used to display the new image for the section N on the screen, the CPU 20 performs a display process B using yellow background color in step Sc5. Suppose that the display panel 130 changes section 1 of page 1 of the musical score with section 1 of page 2 of the musical score, for example. In that case, an image (i.e., a staff, notes and other musical symbols) of section 1 of page 2 of the musical score is displayed with the yellow background color on an uppermost section of the screen of the display panel 130, while images of sections 2–6 of page 1 of the musical score remain on the screen with the white background color. This allows the user to visually recognize a partial transition of the musical score that is effected from page 1 to page 2 with respect to section 1 on the uppermost section of the screen. In addition, the user is able to easily distinguish between the sections of the present page, which remain on the screen, and the section of the next page which is newly displayed on the screen.

If the variable P is set to an odd number in step Sc4, the flow proceeds to step Sc6 in which the CPU 20 reads musical score data whose page is designated by the variable P and whose section is designated by the variable N, so that the read musical score data is used to display a new image for section N of the musical score on the screen. If the musical score data of the odd-numbered page is used to display the new image for the section N of the musical score on the screen, the CPU 20 performs a display process A using the white background color with respect to the section N. In this case, the display panel 130 originally displays an image of an even-numbered page of the musical score, which is partially changed with an image of the odd-numbered page of the musical score. Thus, the musical score displayed on the screen is partially changed in background color with respect to the section N.

As described above, the CPU 20 alternatively performs the display process B of step Sc5 and the display process A of step Sc6 with respect to the section N of the musical score on the screen. After completion of the step Sc5 or Sc6, the flow proceeds to step Sc7 in which the variable N is incremented by '1'. In step Sc8, a decision is made as to whether the incremented variable N exceeds '6' or not. If N is above '6', it is presumed that the CPU 20 completes the display image change process with respect to all of the six sections on the screen. Therefore, the flow proceeds to step Sc9 in which the variable P is incremented by '1', and the variable N is set to '1'. That is, the CPU 20 proceeds to the next page for processing. In step Sc10, a decision is made as to whether the variable P representing the next page is greater than the last page or not. If the next page is greater than the last page, it is presumed that the display image change process is completed on all pages of the musical score in the auto change mode. Hence, the flow proceeds to step Sc11 in which the variable M is set to '0'. Then, the apparatus ends the display image change process. If the CPU 20 determines in step Sc10 that the next page (i.e., variable P) corresponds to the last page or less, the flow proceeds to step Sc12, which is similar to the foregoing step Sb8 of the initial image display process shown in FIG. 7. That is, the timer is set to the value that is designated by the time count data contained in the musical score data (see FIG. 4). If the CPU 20 determines in step Sc8 that the variable N is '6' or less, the flow directly proceeds to step Sc12 in which the timer is set to the value of the time count data.

The aforementioned steps show the display image change process in the auto change mode that is executed upon the decision of M=1 in the step Sc1. If the CPU 20 determines in step Sc1 that the variable M is not set to '1', the flow proceeds to step Sc13 in which a decision is made as to whether the variable M is set to '2' or not. If the variable M is not set to '2', in other words, if the apparatus is not set in the auto change mode and full change mode, there is no need to change over images displayed on the screen. Hence, the apparatus immediately ends the display image change process.

If M=2 indicating the full change mode, it is necessary to entirely change the image of the musical score data across the screen. In order to do so, the CPU 20 clears an entire image of the musical score being presently displayed on the screen in step Sc14. In step Sc15, a decision is made as to whether the variable P is an even number or not. In other words, a decision is made as to whether or not musical score data of an even-numbered page is used to display a new image of the musical score on the screen. If the variable P is the even number, the flow proceeds to step Sc16 in which the CPU 20 reads the musical score data of the page 'P' with respect to its all sections. Thus, an entire image of the screen is instantaneously changed over with a new one based on the read musical score data. If the musical score data of the even-numbered page is used to display the new image of the musical score entirely on the screen, the CPU 20 performs a display process B using yellow background color in step Sc16. In this case, the background color that is originally white color in displaying the previous page (i.e., odd-numbered page) of the musical score is entirely changed across the screen, so that six staves and notes represented by the musical score data of the even-numbered page are displayed with the yellow background color on the screen. Because the while background color for use in displaying the previous odd-numbered page of the musical score data is instantaneously and entirely changed across the screen with the yellow background color for use in displaying the present even-numbered page of the musical score, the user is able to visually recognize an entire transition of the musical score that is effected from the odd-numbered page to the even-numbered page.

If the CPU 20 determines in step Sc15 that the variable P is an odd number, the flow proceeds to step Sc17 in which the CPU 20 reads musical score data of the page 'P' with respect to its all sections. Based on the read musical score data, the display panel 130 displays a new image of the musical score on the screen. That is, the CPU 20 instantaneously changes over the previous image of the musical score with the new image of the musical score designated by the variable P on the screen. If the musical score data of the odd-numbered page is used to display the new image entirely on the screen, the CPU 20 performs a display process A using white background color. Since the display panel 130 previously displays the image of the even-numbered page of the musical score, the corresponding staves and notes are displayed with the yellow background color on the screen. The background color is now instantaneously changed to white color for use in displaying the image of the odd-numbered page of the musical score data on the screen. Therefore, the user is able to visually recognize an entire transition of the musical score that is effected from the even-numbered page to the odd-numbered page.

By completion of the step Sc16 or Sc17, the CPU 20 completes the display process B or A in the full change mode. Then, the flow proceeds to step Sc18 in which the variable P is incremented by '1', and the variable N is set to '1'. Thus, the CPU 20 proceeds to the next page for processing. Because the display image change process is completed in the full change mode, the variable M is set to '0' in step Sc19. Then, the apparatus ends the display image change process.

By repeating the operation process, initial image display process and display image change process, it is possible to realize automatic changes of images of the musical score being successively displayed on the screen in the auto change mode. FIGS. 10A to 10F show examples of the images of the musical score being successively displayed on the screen. For convenience' sake, FIGS. 10A–10F each show simplified diagrams each consisting of six sections (corresponding to the six staves or sections of the musical score displayed on the screen) accompanied with prescribed background colors, which are sequentially changed from white to yellow. That is, FIGS. 10A–10F show a series of transitions that are sequentially effected on the six sections (or six staves and notes) in a direction from the uppermost section to the lowermost section, so that an entire image of the musical score of the odd-numbered page which is originally displayed with white background color on the screen as shown in FIG. 10A is successively changed section by section to an entire image of the musical score of the even-numbered page which is to be displayed with yellow background color on the screen as shown in FIG. 10F. In FIGS. 10A–10F, six sections are divided by five boundaries corresponding to four dotted lines and one full line, all of which are imaginary lines and are not actually displayed on the screen. In addition, the full line is used to represent a boundary between the section(s) of the musical score of the odd-numbered page and the section(s) of the musical score of the even-numbered page.

FIG. 10A shows that all of six sections (namely, section 1 to section 6) of the musical score are displayed with white background color on the screen in response to the odd-numbered page. When the prescribed time designated by the time count data elapses, section 1 (which is the uppermost section on the screen) of the musical score of the odd-numbered page is automatically changed to section 1 of the musical score of the even-numbered page. That is, section 1 is changed in content and is also changed in background color from white to yellow on the screen as shown in FIG. 10B, wherein other sections 2–6 remain with white background color, so that a full-line boundary between the even-numbered page and odd-numbered page of the musical score is imaginarily drawn between section 1 and section 2. Watching such a change of the background color, the user is able to visually recognize a changeover of the content of the section 1 of the musical score on the screen. In this case, the user is capable of visually distinguishing between the section of the musical score of the even-numbered page (or next page) and the sections of the musical score of the odd-numbered page (or present page).

After the display panel 130 completes the aforementioned change of the section 1 from the present page to the next page on the screen, when the prescribed time elapses again, section 2 of the musical score is automatically changed in content from the present page to the next page, so that the background color is correspondingly changed from white to yellow with respect to the section 2 of the musical score on the screen as shown in FIG. 10C, wherein a full-line boundary between the even-numbered page and odd-numbered page of the musical score is imaginarily drawn between section 2 and section 3. Every time the prescribed time elapses, the image of the musical score is sequentially changed over section by section on the screen, which is shown by FIGS. 10D to 10F. During sequential transitions of sections on the screen, a difference of background color emerges between the certain section, which is lately changed in content to display the musical score of the next page, and its lower section which remains in content to continuously display the musical score of the present page. Detecting such a difference of the background color on the screen, the user is able to easily make a recognition as to how far the transition of the musical score is effected from the present page to the next page. Finally, all of the six sections are completely changed from the present page to the next page and are displayed with yellow background color on the screen.

When the user operates the operator console 120 to designate a full change L-i:. mode, the image of the musical score is instantaneously changed on the screen from the present page to the next page with respect to all of the six sections. In such a full change mode, the background color is simultaneously changed from one color to another in response to the change of the image of the musical score on the screen. Thus, the user is able to visually recognize a full transition of the image of the musical score from the present page to the next page on the screen with ease.

As described above, the musical score display apparatus of the present embodiment is characterized in that the background color is automatically changed from one color to another between the consecutive even-numbered page and odd-numbered page in response to changes of images of the musical score on the screen. Hence, the user is able to visually recognize transitions of the images of the musical score from one page to another on the screen with ease. Particularly, the present embodiment is effective in the auto change mode in which the images of the musical score are not shifted from one image to another by manual timings, which the user manually designates by operating the operator console 120, but are automatically changed at automatic timings automatically designated by the prescribed time set to the time count data. Because, the user is not always capable of discriminating whether or not the images of the musical score are shifted from one page to another by the manual timings. Therefore, the present embodiment can demonstrate special effects in automatically changing the background color, which is one style of display, in response to transitions of the images of the musical score.

In the auto change mode of the present embodiment, staves and notes of the musical score do not move vertically (or horizontally) on the screen, wherein the image of the musical score is automatically changed section by section on the screen. This reduces the probability that the user will overlook the desired part of the musical score on the screen. If the display image change process is designed to merely change the image of the musical score section by section on the screen, each section is instantaneously changed from one image to another, so the user may have a difficulty in recognizing a transition of the image of the musical score as compared with the aforementioned scroll display method and the like in which the image of the musical score moves vertically on the screen. That is, in the scroll display method, the user is able to recognize transitions of the musical score by detecting gradual movements of images on the screen. In the auto change mode in which the image of the musical score is instantaneously changed over section by section on the screen, the user may have a difficulty in recognizing transitions of the musical score if the user overlooks the 'instantaneous' timing at which the certain section of the musical score is instantaneously changed in content. The present embodiment is designed to solve the aforementioned problem by automatically changing the background color between the consecutive even-numbered page and odd-numbered page on the screen in response to transitions of images of the musical score. Detecting the difference of the background color on the screen, the user who overlooks the instantaneous timing at which the certain section of the musical score is instantaneously changed in content is able to easily recognize transitions of images of the musical score between the consecutive pages with ease.

In addition, the present embodiment is designed such that in the auto change mode of the display image change process, images are successively changed over on the screen section by section upon a lapse of the prescribed time, which is set in advance in consideration of the time necessary for musical performance of each section. That is, if the user (or player) plays music in accordance with notes and other musical notations on the musical score, the sections are successively changed with new ones at the timings when the user finishes playing the notes on the staves of the sections respectively, wherein the section of which the user has just finished playing the notes is changed in background color. Then, the user moves his/her eyes downwardly to the next section that is displayed vertically lower than the previously played section and that is displayed just below a boundary, which is formed between different background colors, on the screen. Concretely speaking, in the case of FIG. 10A, the uppermost section shows notes of the musical score that the user should play presently. After the user finishes playing the notes of the staff of the uppermost section, the uppermost section is changed in background color from white to yellow as shown in FIG. 10B. Then, the user moves his/her eyes downwardly to the second section that shows notes to be played and that is just below a boundary, formed between yellow background color and white background color, on the screen. By detecting such a boundary formed between the different background colors, the user is able to visually recognize which section is to be played presently on the screen with ease. The aforementioned auto change mode of the display image change process may be convenient for 'experienced' players who are able to play the music at the preset performance velocity (or tempo) that is designated by the musical score. However, 'inexperienced' players such as beginners may have difficulties in keeping up with the present performance velocity, which is preset in the auto change mode, because they are used to play the music at a slower tempo. Hence, images of the musical score are automatically changed over section by section on the screen before inexperienced players actually finish playing notes of the section being presently designated in the musical score. Such difficulties can be easily solved by changing the time count data (see FIG. 4) to be larger as compared with the foregoing one. Increasing the time count data, it is possible to slow down the velocity for changing over images of the musical score section by section on the screen. Thus, it is possible to reduce possibilities in which the display panel 130 automatically changes over the images on the screen before the player actually finishes playing the notes of the designated section. As described above, the present embodiment can be easily modified such that the user is capable of arbitrarily setting the timing and velocity for automatically changing over images of the musical score section by section on the screen in response to the user's level of musical performance. It is possible to designate the user's level of musical performance manually or automatically. To automatically designate the user's level of musical performance, the present embodiment is partially modified such that key sensors are provided for keys of the grand piano 100 respectively. The key sensors are used to detect the user's touch or depression on the keys respectively. By comparing outputs of the key sensors and performance data (e.g., notes) of the musical score, detection is made as to positions of the musical score at which the user now proceeds to in musical performance. Hence, the apparatus automatically detects progression of the user's musical performance to adequately change over images of the musical score section by section on the screen in response to the detection results. Thus, the apparatus realizes optimal changeovers of images of the musical score on the screen in conformity with the user's progression of musical performance.

[C] Modified Examples

The present invention is not necessarily limited to the aforementioned embodiment, hence, it is possible to propose a variety of modified examples for partially modifying the embodiment within the scope of the invention.

(1) First Modified Example

The present embodiment is designed such that the background color is automatically changed over between the even-numbered page and odd-numbered page of the musical score being displayed on the screen. Herein, the background color is merely one example of attributes or styles for enhancement of images displayed on the screen. Hence, it is possible to change other attributes such as background patterns, other than the background colors, in response to changeovers of pages of the musical score displayed on the screen. In addition, it is possible to change colors of lines of the staff (or staves) in response to changeovers of pages of the musical score on the screen. Further, it is possible to change the color of the notes in response to changeovers of pages of the musical score on the screen. In summary, the present invention allows the user to easily recognize changeovers of the pages of the musical score by adequately changing styles in display between the even-numbered page and odd-numbered page of the musical score on the screen.

(2) Second Modified Example

As described above, the present embodiment is designed to change the background color between the even-numbered page and odd-numbered page of the musical score on the screen. Herein, the background color is changed with respect to each of the sections included in one page of the musical score being displayed on the screen. It is possible to modify the present embodiment such that the background color is changed with respect to each of the pages of the musical score being successively displayed on the screen. For example, a first page is displayed with white background color, a second page is displayed with yellow background color, a third page is displayed with red background color, and a fourth page is displayed with light-blue background color. In addition, it is possible to further change other styles in display such as the background patterns, colors of lines of staves, and colors of notes with respect to each of the pages of the musical score being displayed on the screen.

(3) Modified Example 3

The present embodiment is basically designed to employ the method in which the sections (or staves) of the musical score do not move vertically on the screen in the auto change mode. Instead, it is possible to employ the foregoing scroll display method that is generally used. That is, as shown in FIGS. 11A to 11C, images are sequentially scrolled upwardly on the screen. As shown in FIG. 11A, the display panel 130 originally displays sections 1–6 of page A with white background color on the screen, wherein images are sequentially scrolled upwardly section by section on the screen. Hence, in a next cycle (see FIG. 11B), section 1 of page A disappears from the screen, while sections 2–6 of page A are vertically scrolled upward by one section, wherein section 1 of page B (i.e., next page) is newly displayed with yellow background color in the lowermost section on the screen. In a further next cycle (see FIG. 11C), section 2 of page A disappears from the screen, while sections 3–6 of page A are vertically scrolled upwardly by one section, wherein sections 1 and 2 of page B are displayed with yellow background color in the lower area on the screen. In the case of FIGS. 11A to 11C, all of the six sections are scrolled upwardly on the screen, so that the user must pay attention to movements of the sections on the screen. Instead, it is possible to realize another scroll display method without changing original positions of the sections on the screen, which will be described with reference to FIGS. 11D to 11F. That is, the display panel 130 originally displays sections 1–6 of page A with white background color on the screen as shown in FIG. 11D. In a next cycle (see FIG. 11E), section 6 of page B (i.e., the next page) is substituted for section 1 of page A and is displayed with yellow background color in the uppermost section on the screen, while other sections 2–6 of page A remain at the same positions on the screen. In a further next cycle (see FIG. 11F), sections 5 and 6 of page B are displayed with yellow background color in the upper area on the screen, while sections 3–6 of page A remain at the same positions on the screen. That is, FIGS. 11D to 11F show the scroll display method in which the sections of the next page scroll downwardly on the screen while the sections of the present page remain at the original positions on the screen. In the above, it is possible to further change styles of display between adjacent pages of the musical score. Thus, the user is able to easily recognize changeovers of the pages of the musical score on the screen. In short, the scroll display method is not necessarily limited in scroll direction, wherein images can be scrolled upwardly or downwardly. In addition, scrolling the images is not necessarily made vertically, so it can be made horizontally on the screen. That is, the present invention is applicable to other types of display image change methods in which the images are sequentially moved horizontally on the screen.

(4) Fourth Modified Example

The present embodiment is designed such that in the auto change mode, the image of the musical score displayed on the screen is automatically and partially changed over upon a lapse of the prescribed time which is counted by the timer, while in the full change mode, the entire image of the musical score displayed on the screen is manually changed over to a new one at a timing that is designated by the user operating the operator console 120 and the like. It is possible to modify the present embodiment such that in the full change mode, the entire image can be automatically changed over in response to the timer count. In addition, it is possible to partially change over the image on the screen at the timing that is designated by the user operating a part change switch and the like. Further, it is possible to additionally provide the apparatus with a auto change start switch. When the user operates the auto change start switch under the condition of M=1, the apparatus starts the timer counting, which is set by the foregoing step Sb8 shown in FIG. 7.

(5) Fifth Modified Example

The present embodiment teaches the musical score display apparatus that is installed in the grand piano 100. The musical score display apparatus is not necessarily limited in place of installation, that is, it is possible to install the apparatus on other musical instruments. Alternatively, it is possible to use the musical score display apparatus independently of the musical instruments. In other words, the musical score display processes of the present embodiment are applicable to other types of displays, which are installed in the portable terminal devices such as the personal computers, game devices and cellular phones, for example. Hence, those devices can be designed to execute the musical score display processes in accordance with the present invention.

(6) Sixth Modified Example

The present embodiment is designed such that the display panel 130 simultaneously displays six staves in six sections on the screen. The number of the sections being simultaneously displayed on the screen can be arbitrarily designated. In addition, it is possible to display other types of scores, namely roll scores, tab scores and drum scores other than the normal staves in the musical score. Further, images being displayed on the screen are not necessarily limited to the staves, notes and other musical symbols in musical notation. Hence, it is possible to use any types of images whose contents are closely connected with each other among multiple pages to be successively displayed on the screen. In other words, the present invention is applicable to any types of display apparatuses that sequentially change over images of consecutive pages on the screen.

(7) Seventh Modified Example

The present embodiment is designed to display images of the musical score based on musical score data that are read from the storage media by the disk drive 23. Instead, it is possible to use other types of musical score data that are distributed from the external devices (e.g., servers) via the data communication networks such as the Internet.

Lastly, as this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A data display method comprising the steps of:
   providing a series of data representing a plurality of images that are to be successively displayed on a screen in-a prescribed order; and
   automatically changing styles of display between adjacent images that are to be sequentially displayed on the screen, so that the images being sequentially updated are respectively accompanied with different styles of display on the screen,
   wherein the data correspond to musical score data representing a musical score of a prescribed musical tune that is configured by a plurality of pages corresponding to the plurality of images respectively.

2. A data display method according to claim 1 wherein the styles of display correspond to background colors or background patterns.

3. A data display method according to claim 1 further comprising the steps of:
   automatically dividing each of the images into a plurality of sections that are simultaneously displayed on the screen;
   setting positions at which the plurality of sections are respectively displayed on the screen; and
   sequentially updating the images section by section without changing the positions set to the plurality of sections respectively.

4. A data display method according to claim 2 further comprising the steps of:
   automatically dividing each of the images into a plurality of sections that are simultaneously displayed on the screen;

setting positions at which the plurality of sections are respectively displayed on the screen; and sequentially updating the images section by section without changing the positions set to the plurality of sections respectively.

5. A data display method comprising the steps of:

providing a series of data representing a plurality of images that are to be successively displayed on a screen in a prescribed order; and automatically changing styles of display between adjacent images that are to be sequentially displayed on the screen, so that the images being sequentially updated are respectively accompanied with different styles of display on the screen, wherein the data correspond to musical score data representing a musical score of a prescribed musical tune that is configured by a plurality of pages respectively corresponding to the plurality of images, which are successively changed over on the screen in accordance with progression of musical performance of the musical score.

6. A data display method according to claim 5 wherein the styles of display correspond to background colors or background patterns.

7. A data display method according to claim 5 further comprising the steps of:

automatically dividing each of the images into a plurality of sections that are simultaneously displayed on the screen;

setting positions at which the plurality of sections are respectively displayed on the screen; and sequentially updating the images section by section without changing the positions set to the plurality of sections respectively.

8. A musical score display method comprising the steps of:

providing a series of musical score data representing images of consecutive pages of a musical score of a prescribed musical tune, which are successively displayed on a screen;

dividing each of the images of the consecutive pages of the musical score into a plurality of sections, each of which corresponds to at least a prescribed length of a staff for arranging notes in musical notation and which are arranged at different positions on the screen in its vertical direction;

assigning different background colors to odd-numbered pages and even-numbered pages of the musical score respectively, so that the odd-numbered pages and the even-numbered pages are displayed with the different background colors respectively on the screen; and automatically changing over the images section by section on the screen in response to time count data representing a prescribed time by which each section is to be played.

9. A musical score display method according to claim 8 wherein the plurality of sections are displayed at fixed positions on the screen, so that the images are changed over section by section without changing the positions of the sections on the screen.

10. A musical score display method according to claim 8 wherein automatically changing the images is realized by vertically scrolling the plurality of sections on the screen.

11. A data display apparatus comprising:

a data provider for providing a series of data representing a plurality of images that are to be successively displayed on a screen in a prescribed order; and a display style changer for automatically changing styles of display between adjacent images that are to be sequentially displayed on the screen, so that the images being sequentially updated are respectively accompanied with different styles of display on the screen, wherein the data correspond to musical score data representing a musical score of a prescribed musical tune that is configured by a plurality of pages corresponding to the plurality of images respectively.

12. A musical score display apparatus comprising:

a provider for providing a series of musical score data representing images of consecutive pages of a musical score of a prescribed musical tune, which are successively displayed on a screen;

a divider for dividing each of the images of the consecutive pages of the musical score into a plurality of sections, each of which corresponds to at least a prescribed length of a staff for arranging notes in musical notation and which are arranged at different positions on the screen in its vertical direction;

an assigner for assigning different background colors to odd-numbered pages and even-numbered pages of the musical score respectively, so that the odd-numbered pages and the even-numbered pages are displayed with the different background colors respectively on the screen; and an image changer for automatically changing over the images section by section on the screen in response to time count data representing a prescribed time by which each section is to be played.

13. A machine-readable media storing programs that cause a computer coupled with a display to perform a data display method comprising the steps of:

providing a series of data representing a plurality of images that are to be successively displayed on a screen of the display in a prescribed order; and automatically changing styles between adjacent images that are to be sequentially displayed on the screen of the display, so that the images being sequentially updated are respectively accompanied with different styles on the screen, wherein the data correspond to musical score data representing a musical score of a prescribed musical tune that is configured by a plurality of pages corresponding to the plurality of images respectively.

14. A machine-readable media storing programs that cause a computer coupled with a display to perform a musical score display method comprising the steps of:

providing a series of musical score data representing images of consecutive pages of a musical score of a prescribed musical tune, which are successively displayed on a screen of the display;

dividing each of the images of the consecutive pages of the musical score into a plurality of sections, each of which corresponds to at least a prescribed length of a staff for arranging notes in musical notation and which are arranged at different positions on the screen in its vertical direction;

assigning different background colors to odd-numbered pages and even-numbered pages of the musical score respectively, so that the odd-numbered pages and the even-numbered pages are displayed with the different background colors respectively on the screen; and automatically changing over the images section by section on the screen in response to time count data representing a prescribed time by which each section is to be played.

* * * * *